United States Patent
Jasmin

(10) Patent No.: US 12,009,774 B1
(45) Date of Patent: Jun. 11, 2024

(54) L-FOOT ADAPTER FOR RAIL-BASED SOLAR PANEL RACKING SYSTEMS

(71) Applicant: Sunmodo Corporation, Vancouver, WA (US)

(72) Inventor: Roland Jasmin, Portland, OR (US)

(73) Assignee: Sunmodo Corporation, Vancouver, WA (US)

( * ) Notice: Subject to any disclaimer, the term of this patent is extended or adjusted under 35 U.S.C. 154(b) by 0 days.

(21) Appl. No.: 18/400,244

(22) Filed: Dec. 29, 2023

(51) Int. Cl.
| | |
|---|---|
| *H02S 20/23* | (2014.01) |
| *F16B 5/02* | (2006.01) |
| *F24S 25/61* | (2018.01) |
| *F24S 25/636* | (2018.01) |
| *F24S 25/65* | (2018.01) |
| *H02S 30/00* | (2014.01) |
| *F24S 25/00* | (2018.01) |
| *F24S 25/60* | (2018.01) |

(52) U.S. Cl.
CPC .............. *H02S 20/23* (2014.12); *F16B 5/02* (2013.01); *F24S 25/61* (2018.05); *F24S 25/636* (2018.05); *F24S 25/65* (2018.05); *H02S 30/00* (2013.01); *F24S 2025/021* (2018.05); *F24S 2025/6005* (2018.05); *F24S 2025/6006* (2018.05); *Y02E 10/47* (2013.01)

(58) Field of Classification Search
CPC .......... H02S 20/10; H02S 20/22; H02S 20/12; H02S 30/00; H02S 30/10; F24S 2025/021; F24S 2025/6005; F24S 2025/6007; F24S 25/33; F24S 25/61; F24S 25/65; F24S 25/636
See application file for complete search history.

(56) References Cited

U.S. PATENT DOCUMENTS

| | | | |
|---|---|---|---|
| 949,321 A | * | 2/1910 | Good .................... E01B 11/62 238/263 |
| 5,203,135 A | | 4/1993 | Bastian |
| (Continued) | | | |

FOREIGN PATENT DOCUMENTS

| | | |
|---|---|---|
| CN | 205566178 U | 9/2016 |
| CN | 206251017 U | 6/2017 |
| (Continued) | | |

OTHER PUBLICATIONS

NXT Umount, Part & Assembly Drawings, Nov. 2022, Unirac, Albuquerque, New Mexico.

(Continued)

*Primary Examiner* — Jessie T Fonseca
(74) *Attorney, Agent, or Firm* — Stone Creek Services LLC; Alan M Flum

(57) ABSTRACT

Described are supports with devices or brackets, that are specially mounted, such as L-foot adapters, that help mount solar panel racking systems to roofs. The L-foot adapter assembly may include an L-foot adapter body and a spacer that is removable and positionable between the two sides of the L-foot adapter body. A threaded fastener extends through the first of the two sides of the L-foot adapter body, through the spacer, and threadedly engages the second side of the L-foot adapter body. The spacer limits how much the two sides of the L-foot adapter body can be squeezed together and therefore prevents overtightening.

25 Claims, 14 Drawing Sheets

(56) References Cited

U.S. PATENT DOCUMENTS

| | | | |
|---|---|---|---|
| 8,387,319 B1* | 3/2013 | Gilles-Gagnon | F24S 25/33 52/173.3 |
| 8,413,944 B2 | 4/2013 | Harberts et al. | |
| 8,745,936 B2 | 6/2014 | Plaisted et al. | |
| 8,984,818 B2 | 3/2015 | McPheeters et al. | |
| 9,057,542 B2 | 6/2015 | Schuit et al. | |
| 9,160,273 B2 | 10/2015 | Schuit et al. | |
| 9,193,014 B2 | 11/2015 | Danning | |
| 9,893,677 B1 | 2/2018 | Liu | |
| 10,177,704 B2 | 1/2019 | Kapla et al. | |
| D853,954 S | 7/2019 | McPheeters | |
| D909,853 S | 2/2021 | Jasmin | |
| 11,152,889 B1 | 10/2021 | Affentranger, Jr. et al. | |
| 11,251,743 B2 | 2/2022 | Schuit et al. | |
| 11,296,648 B1 | 4/2022 | Jasmin et al. | |
| 11,463,040 B2 | 10/2022 | Affentranger, Jr. | |
| D983,015 S | 4/2023 | Jasmin et al. | |
| D983,016 S | 4/2023 | Jasmin et al. | |
| D983,018 S | 4/2023 | Jasmin et al. | |
| 11,621,665 B2 | 4/2023 | Jasmin et al. | |
| 11,750,143 B1 | 9/2023 | Jasmin et al. | |
| 11,824,483 B1 | 11/2023 | Affentranger, Jr. | |
| 2008/0203242 A1* | 8/2008 | Buck | F16L 3/11 248/62 |
| 2010/0276558 A1 | 11/2010 | Faust et al. | |
| 2011/0247295 A1* | 10/2011 | Stearns | E04B 1/66 248/237 |
| 2012/0211252 A1 | 8/2012 | Turziano et al. | |
| 2013/0011187 A1 | 1/2013 | Schuit et al. | |
| 2013/0200245 A1* | 8/2013 | Markiewicz | F16B 7/187 248/500 |
| 2014/0001129 A1 | 1/2014 | Danning | |
| 2014/0042286 A1* | 2/2014 | Jaffari | F24S 25/30 248/316.4 |
| 2014/0110543 A1* | 4/2014 | Aliabadi | H02S 20/20 248/201 |
| 2015/0183066 A1* | 7/2015 | Lippert | F24S 25/636 29/428 |
| 2015/0184896 A1* | 7/2015 | Lippert | F24S 25/12 211/41.1 |
| 2015/0240845 A1* | 8/2015 | Mann | F01N 13/1811 24/279 |
| 2015/0357964 A1 | 12/2015 | McPheeters et al. | |
| 2016/0043689 A1* | 2/2016 | McPheeters | H02S 30/10 248/287.1 |
| 2016/0134230 A1* | 5/2016 | Meine | H02S 20/23 52/698 |
| 2016/0226435 A1* | 8/2016 | Almy | F24S 25/636 |
| 2016/0248367 A1* | 8/2016 | Almy | F24S 25/00 |
| 2016/0248368 A1* | 8/2016 | Seery | F24S 25/61 |
| 2016/0248369 A1* | 8/2016 | Almy | F24S 25/61 |
| 2017/0279403 A1* | 9/2017 | Seery | H02S 20/23 |
| 2019/0036474 A1 | 1/2019 | Schuit et al. | |
| 2019/0068110 A1* | 2/2019 | McPheeters | H02S 20/30 |
| 2019/0093340 A1* | 3/2019 | Meine | F16B 33/004 |
| 2019/0178274 A1 | 6/2019 | Katz | |
| 2020/0116191 A1* | 4/2020 | Uppu | H02S 20/00 |
| 2020/0259448 A1* | 8/2020 | Schuit | H02S 20/23 |
| 2021/0285596 A1* | 9/2021 | Affentranger, Jr. | F16M 13/02 |
| 2021/0285689 A1* | 9/2021 | Affentranger, Jr. | F16J 15/104 |
| 2022/0082207 A1* | 3/2022 | Gumaer | F16M 13/027 |
| 2022/0221195 A1 | 7/2022 | Affentranger, Jr. et al. | |
| 2022/0345074 A1 | 10/2022 | Neal et al. | |
| 2022/0368277 A1 | 11/2022 | Jasmin et al. | |

FOREIGN PATENT DOCUMENTS

| | | | |
|---|---|---|---|
| CN | 107248841 A | 10/2017 | |
| CN | 206575356 U | 10/2017 | |
| CN | 206575358 U | 10/2017 | |
| CN | 113794431 A * | 12/2021 | F16F 15/02 |
| DE | 102012007535 A1 | 10/2013 | |
| ES | 211089 U | 5/1976 | |
| KR | 20110058294 A1 | 6/2011 | |
| WO | 2021061866 A1 | 4/2021 | |
| WO | 2022169989 A1 | 8/2022 | |
| WO | 2022197973 A1 | 9/2022 | |
| WO | 2022240909 A1 | 11/2022 | |
| WO | 2023028101 A1 | 3/2023 | |
| WO | 2023192199 A2 | 10/2023 | |

OTHER PUBLICATIONS

SnapNrack Solar Mounting Solutions Ultra Rail Residential PV Mounting Systems Installation Manual, Jan. 2019, SnapNrack, San Luis Obispo, California (a subsidiary of Sunrun Inc.).

SnapNRack Ultra Rail Comp Kit Drawing Set, Revision B, Feb. 2019, SnapNrack, San Luis Obispo, California (a subsidiary of Sunrun Inc.).

SnapNRack UR-60 Splice Drawing Set, May 2019, SnapNrack, San Luis Obispo, California (a subsidiary of Sunrun Inc.).

SnapNRack Ultra Rail Tile Hook F Drawing Set, Jan. 2019, SnapNrack, San Luis Obispo, California (a subsidiary of Sunrun Inc.).

SnapNRack Ultra Rail Mounting Hardware Drawing Set, Revision A, Jan. 2018, SnapNrack, San Luis Obispo, California (a subsidiary of Sunrun Inc.).

Solar's Fastest Attachment NanoMount, Feb. 2020, Sunmodo Corp., Vancouver, Washington.

\* cited by examiner

L-FOOT ADAPTER FOR RAIL-BASED SOLAR PANEL RACKING SYSTEMS

TECHNICAL FIELD

This disclosure relates to supports with brackets that are specially mounted or attached to roofs. More specifically, this disclosure relates to supports with devices or brackets, such as L-foot adapters, that help mount solar panel racking systems to roofs.

BACKGROUND

Solar panel mounting systems, or "racking systems" secure solar panels to roof structures. One common technique for attaching solar panels to roofs involves rails. An installer typically secures two rails beneath the solar panels to provide a stable base. These rails may span the length or width of one or more solar panels. The rails typically attach directly to L-brackets or L-feet ("L-foot" in the singular), which are designed to attach to the roof. In some instances, the rail attaches to an L-foot through an intermediary bracket, such as an L-foot adapter.

SUMMARY

The Inventor develops solar panel racking systems for both commercial and residential use. He noticed that some rail-based solar panel racking systems that use L-foot adapter assemblies might damage the rail by over tightening the threaded fastener that compresses or squeezes the L-foot adapter body against the rail.

To solve this and other problems, the Inventor designed and built an L-foot adapter assembly that prevents damage to the rail from over tightening the threaded fastener. The L-foot adapter assembly includes an L-foot adapter body, a spacer, and a threaded fastener. The L-foot adapter body includes two sides extending upward from a base. The L-foot adapter body may be u-shaped. The L-foot adapter body may be formed from one piece of material, i.e., of one-piece construction. The spacer is positionable and removable between the two sides of the L-foot adapter body. The threaded fastener extends through the first of the two sides of the L-foot adapter body, through the spacer, and threadedly engages the second side of the L-foot adapter body. The spacer limits how much the two sides of the L-foot adapter body can be squeezed together by the threaded fastener. The spacer therefore prevents possible damage to anything held between the two sides of the L-foot adapter body, such as a rail.

Variations in rail construction often require different L-foot adapter bodies. An additional advantage of the Inventor's L-foot adapter assembly, is that some of these variations can be accommodated by changing the spacer, rather than the entire L-foot assembly.

An L-foot typically secures the L-foot adapter body to the roof. The L-foot adapter body typically includes a L-foot base and an L-foot riser that extends upward from the L-foot base. The threaded fastener may extend through an L-foot riser to secure the L-foot to the L-foot adapter. The one-piece structure of the L-foot adapter body creates spring tension between its two sides. This allows the L-foot adapter body to grasp and hold the rail independent of whether the threaded fastener is tightened or loosened. This allows an installer to attach the rail to the L-foot adapter assembly independent of whether the L-foot adapter assembly is attached or secured to the L-foot.

The first side of the two sides of the L-foot adapter body, i.e., the side facing the L-foot, may be cross-sectionally narrower (i.e., thinner) than the second side. With the first side and the second side pressed outward (for example, by a rail), the first side may flex with respect to the bottom of the L-foot adapter body while the second side remains rigid or stationary. With the L-foot adapter body loosely attached to the L-foot, snapping in, or "popping on," the rail to the L-foot adapter body causes the first side of the L-foot adapter body to flex toward the L-foot while the other side remains rigid. With the rail snapped into place, the first side springs back to its resting position. Tightening the threaded fastener pulls the first side and second side further together against the rail and pulls the first side against the riser of the L-foot. As discussed, above, the spacer limits how much the two sides of the L-foot adapter body can be squeezed together and therefore prevents overtightening on the rail. With the threaded fastener tightened, the first side and the L-foot riser form a rigid structure. With the threaded fastener fully tightened, the spacer engages both the first side and the second side of the L-foot adapter body. The first side, the second side, the L-foot riser, and the spacer together form a rigid structure.

Each of the two sides of the L-foot adapter body may include a clamping portion sized, shaped, and structured to secure and prevent upward movement of the rail. These clamping portions may be spaced apart heightwise from the spacer, so the spacer seats the bottom of the rail. The spacer top may be planar, which allows the bottom surface of the rail, if also flat or planar, to seat flush against the spacer.

To prevent the spacer from rotating, especially during installation, the L-foot adapter body may include a platform that extends inward from one side of the L-foot adapter body and is sized, shaped, and positioned to seat the spacer bottom surface.

This Summary discusses various examples and concepts. These do not limit the inventive concept. Other features and advantages can be understood from the Detailed Description, figures, and claims.

DETAILED DESCRIPTION

The Detailed Description includes the following sections: "Definitions," "General Principles," "Additional Details," and "Conclusion and Variations."

Definitions

The Detailed Description and Claims may use ordinals such as "first," "second," or "third," to differentiate between similarly named parts. These ordinals do not imply order, preference, or importance. This disclosure uses "optional" to describe features or structures that are optional. Not using the word "optional" does not imply a feature or structure is required or essential. In this disclosure, "or" is an "inclusive or," unless preceded by a qualifier, such as either, which signals an "exclusive or." As used throughout this disclosure, "comprise," "include," "including," "have," "having," "contain," "containing" or "with" are inclusive, or open-ended, and do not excluded unrecited elements.

General Principles

As discussed in the Summary, the Inventor develops solar panel racking systems for both commercial and residential use. He noticed that some rail-based solar panel racking systems that use L-foot adapter assemblies might damage the rail by over tightening the fastener that squeezes the L-foot adapter body against the rail.

Figure 1:
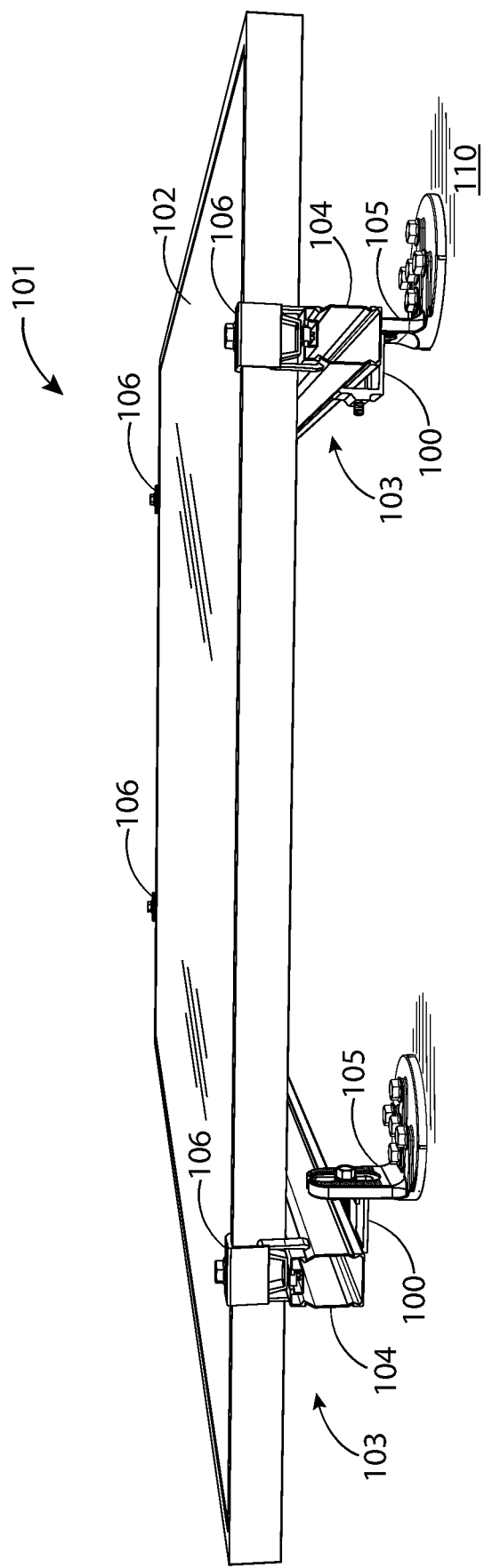
FIG. 1 illustrates, in left and side perspective view, a solar panel system using L-foot adapter assemblies of the present disclosure.
Figure 2:
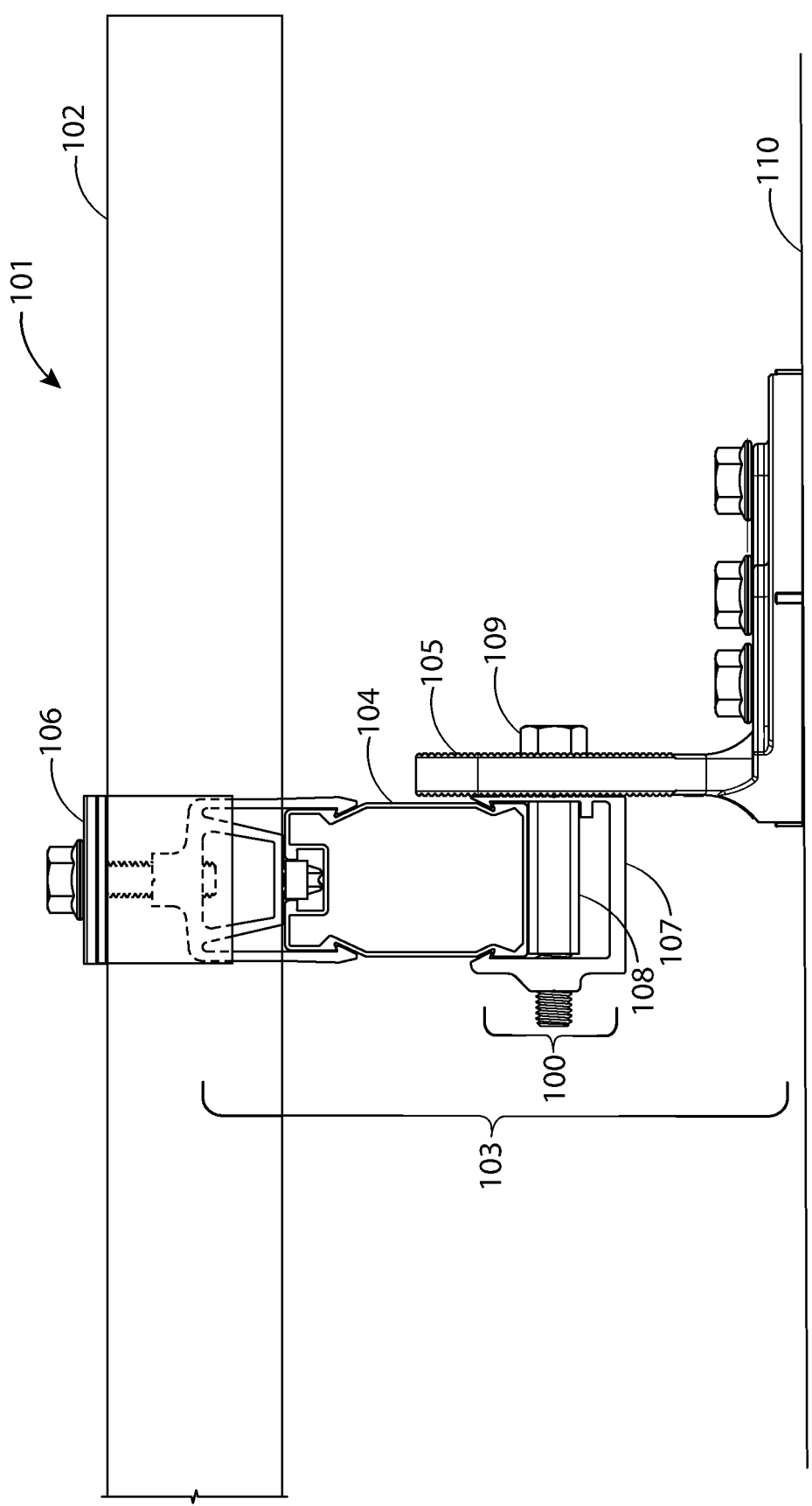
FIG. 2 illustrates, a portion of the solar panel system of FIG. 1 in left side view.

To solve this problem and create other advantages, the Inventor designed and built an L-foot adapter assembly that prevents damage from over tightening. As an example, FIGS. 1 and 2 illustrate several instances of an L-foot adapter assembly 100 in a solar panel system 101 with solar panel 102 and solar panel racking system 103. The solar panel racking system 103 includes L-foot adapter assembly 100, rail 104, L-foot 105, and solar panel clamp 106. The solar panel 102 attaches to rail 104 using a solar panel clamp 106. The rail 104 attaches to the L-foot adapter assembly 100. The L-foot 105 attaches to both the roof 110 and the L-foot adapter assembly 100.

Referring to FIG. 2, the L-foot adapter assembly 100 includes a spacer 108 removably positioned between two sides of the L-foot adapter body 107. The spacer 108 limits how much the threaded fastener 109 can squeeze together the two sides of the L-foot adapter body 107. This prevents possible damage to a rail held by the L-foot adapter body. In addition, because of the removability of the spacer 108, the L-foot adapter assembly 100 can accommodate variations in rail construction that would normally require exchange of the L-foot adapter body.

FIGS. 3-8, illustrate the L-foot adapter assembly 100 in various views with the spacer 108 removably positionable between the first side 107a and the second side 107b of the L-foot adapter body 107. Threaded fastener 109 extends through the first side 107a, through the spacer 108, and threadedly engages the second side 107b of the L-foot adapter body 107.

Figure 9:
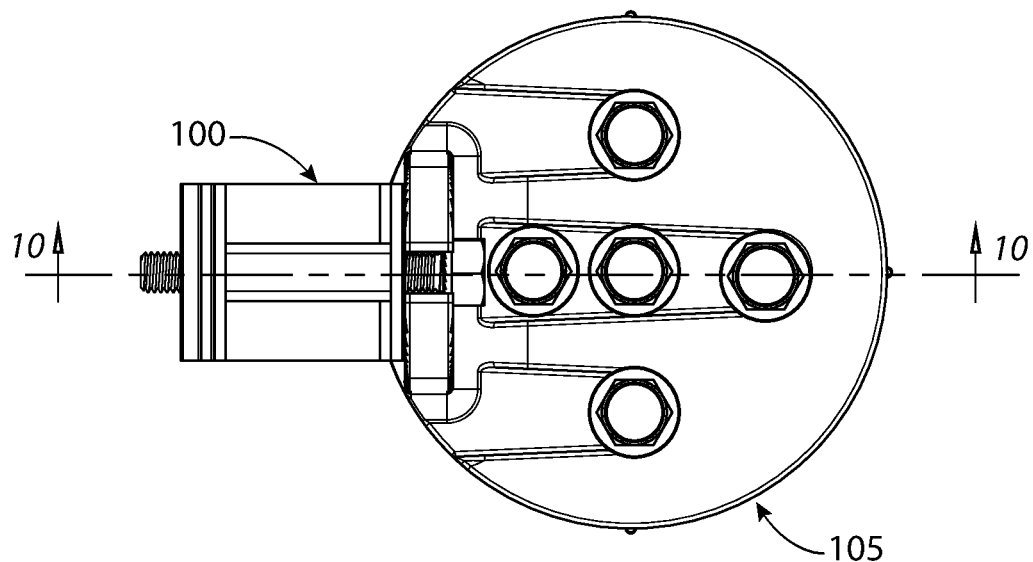
FIG. 9 illustrates a top view of the L-foot adapter assembly together with an L-foot.
Figure 10:
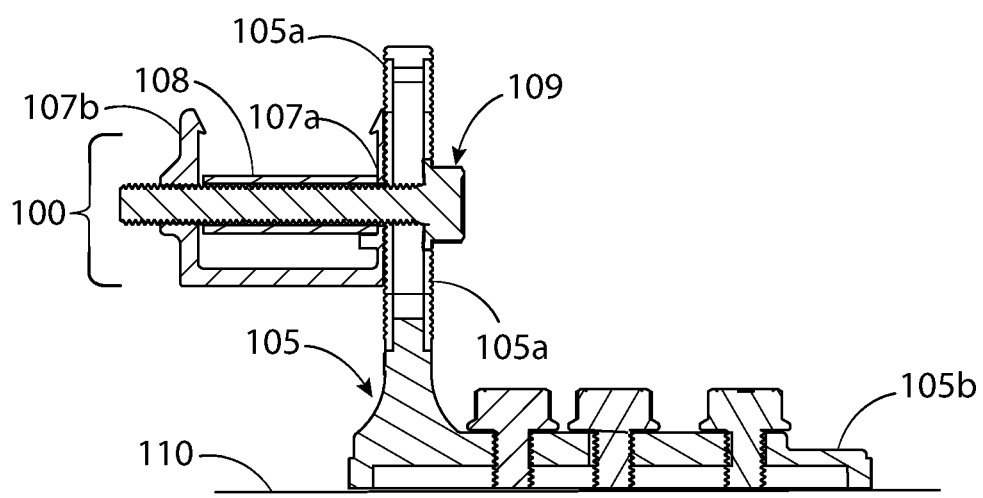
FIG. 10 illustrates a section view taken along section lines 10-10 in FIG. 9.
Figure 11:
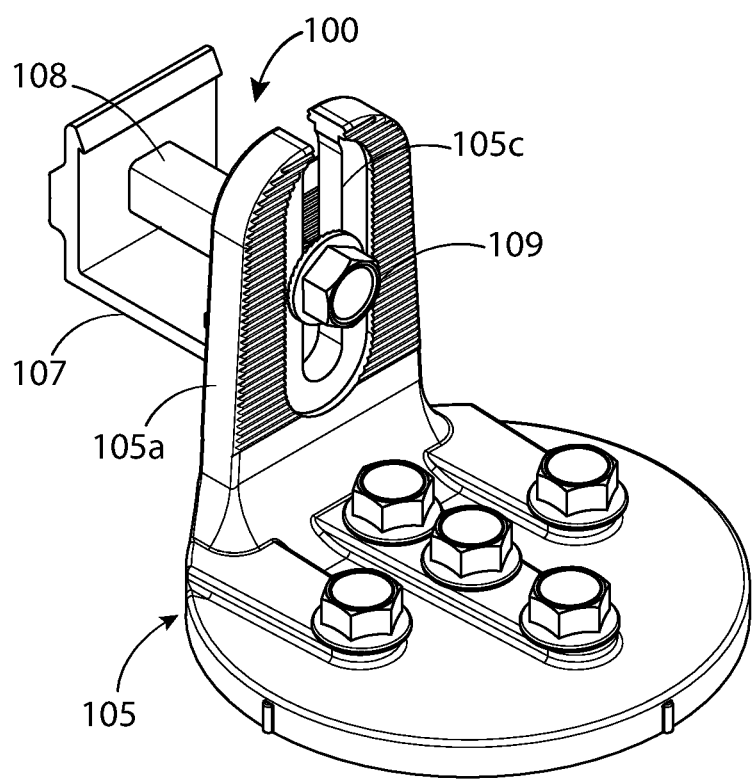
FIG. 11 illustrates a left and front isometric view of the L-foot adapter assembly together with the L-foot.

FIG. 10, which is a section view of the L-foot adapter assembly 100 and L-foot 105 of FIG. 9, shows the threaded fastener 109 extending through the L-foot riser 105a before extending into the first side 107a, the spacer 108, and threadedly engaging the second side 107b. The L-foot riser 105a is the portion of the L-foot 105 extending upward from the L-foot base 105b. The L-foot base 105b is structured to attach to the roof 110. FIG. 11, which is an isometric view of FIG. 9, shows the threaded fastener 109 extending through a slot-shaped opening 105c before extending into the L-foot adapter body 107 and the spacer 108. The slot-shaped opening 105c is located within the L-foot riser 105a.

Figure 12:
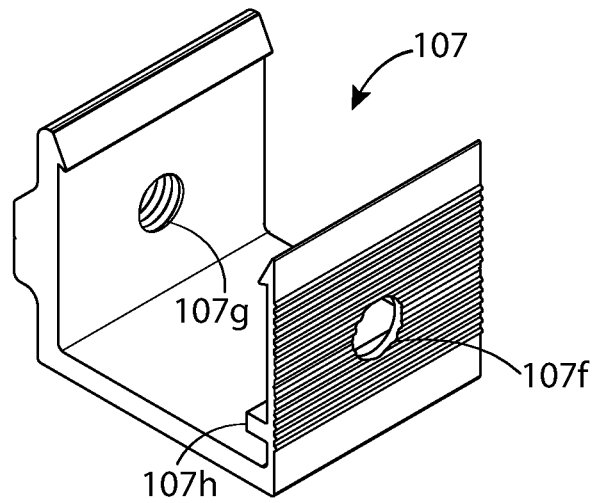
FIGS. 12-14 illustrate the L-foot adapter body in front isometric view, rear isometric view, and left side view, respectively.
Figure 13:
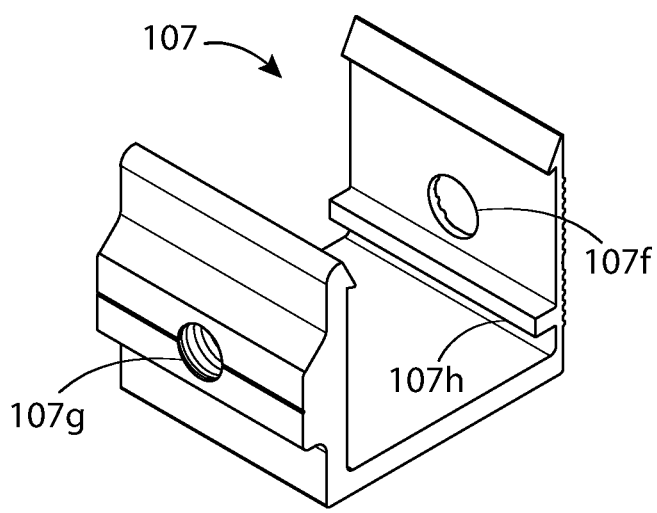
Figure 14:
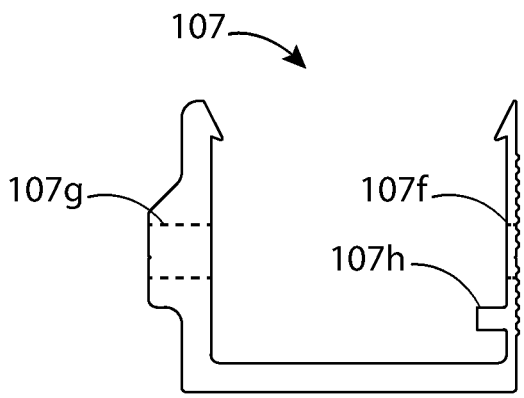

As illustrated in FIGS. 12-14, the L-foot adapter body 107 may be a one-piece body and may be u-shaped. The L-foot adapter body 107 may be extruded, cast, 3D printed, or otherwise formed.

Figure 15:
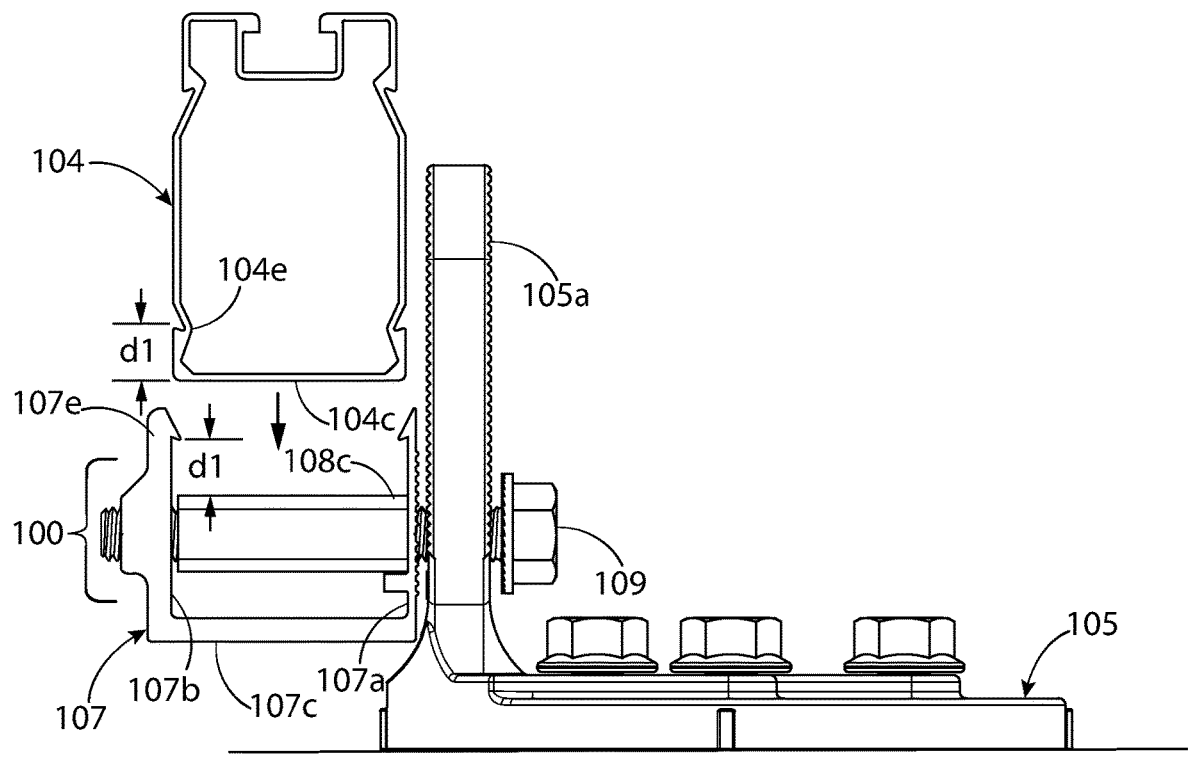
FIG. 15 illustrates, in left side view, a rail about to be attached to the L-foot adapter with the L-foot adapter loosely attached to an L-foot.
Figure 16:
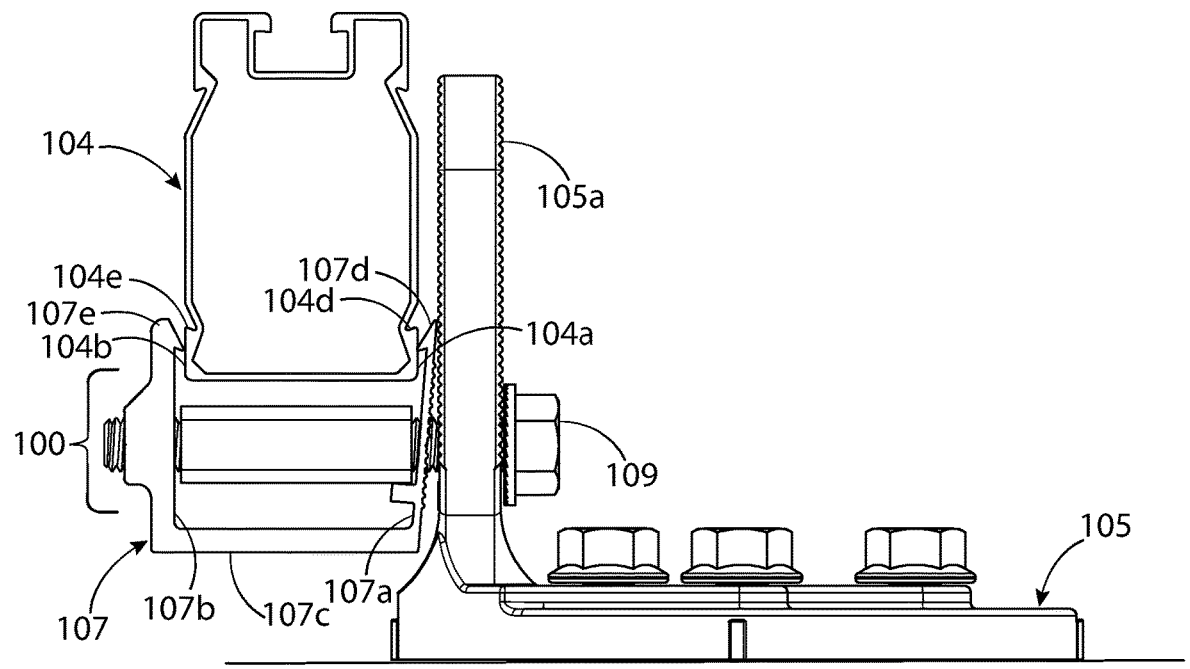
FIG. 16 illustrates, in left side view, a first side of the L-foot adapter body flexing as the rail is being inserted into the L-foot adapter body.

Referring to FIGS. 15 and 16, the first side 107a of the L-foot adapter body 107, i.e., the side facing the L-foot riser 105a, may be cross-sectionally narrower (i.e., thinner) than the second side 107b. FIG. 15, shows the rail 104 about to be inserted into L-foot adapter body 107. FIG. 16 shows the first lower rail side 104a and the second lower rail side 104b, inserted between the first clamping portion 107d and the second clamping portion 107e, respectively, of the L-foot adapter body 107. With the threaded fastener 109 loosely attaching the L-foot adapter body 107 to the L-foot 105, and the first side 107a and the second side 107b pressed outward by the rail 104, the first side 107a of the L-foot adapter body 107 flexes toward the L-foot 105. The second side 107b remains rigid. Note that the first lower rail side 104a and the second lower rail side 104b, are located below the first lower rail detent 104d and the second lower rail detent 104e, respectively of rail 104.

Figure 17:
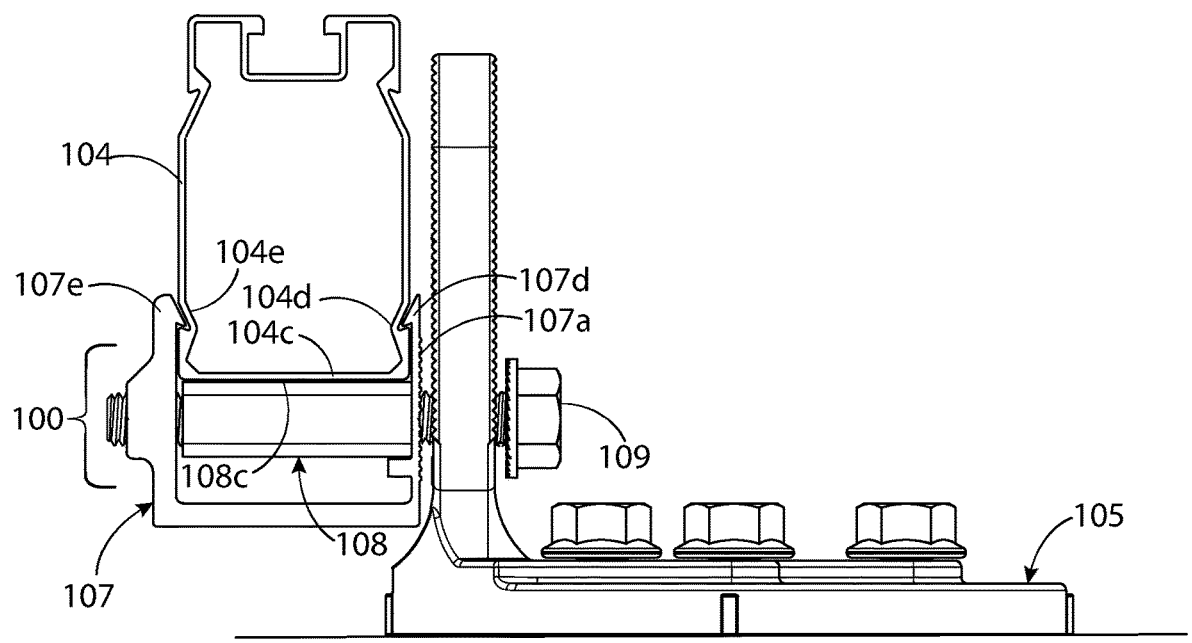
FIG. 17 illustrates, in left side view, a rail secured to an L-foot adapter with the L-foot adapter loosely attached to an L-foot.

Referring to FIG. 17, with the first clamping portion 107d and the second clamping portion 107e snapped into the first lower rail detent 104d and second lower rail detent 104e, respectively, the first side 107a springs back to its resting position. The rail bottom surface 104c rests against the spacer 108. Note that the first clamping portion 107d and second clamping portion 107e are sized, shaped, and structured to secure and prevent upward movement of the rail 104 by staying captive in their respective rail detents.

Figure 18:
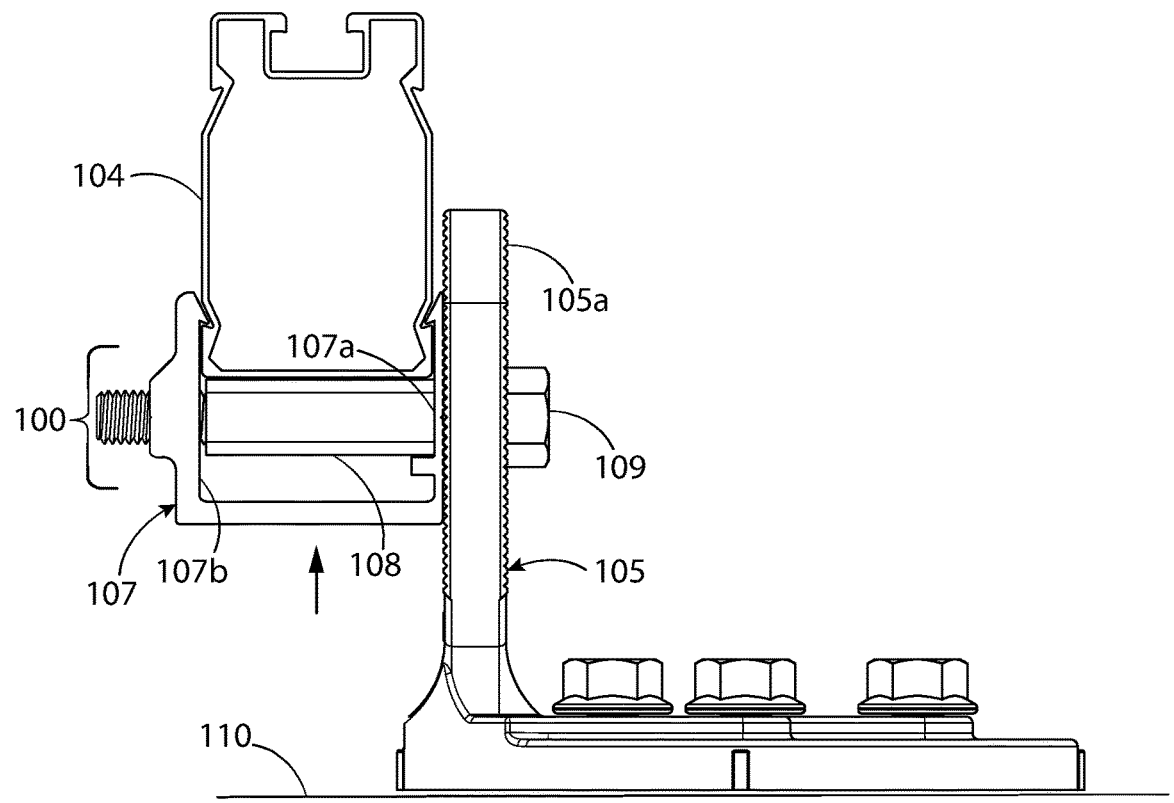
FIG. 18 illustrates, in left side view, a rail secured to an L-foot adapter with the L-foot adapter secured to an L-foot.

Referring to FIG. 18, after positioning the L-foot adapter assembly 100 and rail 104 along the L-foot 105 to a desired height from the roof 110, an installer may then tighten the threaded fastener 109 to lock the L-foot adapter assembly 100 in place. Tightening the threaded fastener 109 pulls the first side 107a and second side 107b further together against the rail 104, and pulls the first side 107a against the L-foot riser 105a. As previously discussed, the spacer 108 limits how much the first side 107a and the second side 107b can be squeezed together, and therefore prevents overtightening and possible damage to the rail 104. With the threaded fastener 109 tightened, the first side 107a and L-foot riser 105a form a rigid structure. With the threaded fastener 109 fully tightened and with the spacer 108 contacting both the first side 107a and the second side 107b, the first side 107a, the L-foot riser 105a, the spacer 108, and the second side 107b form a rigid structure. Note that fully tightened here, means that the spacer 108 limits the extent that the first side 107a and the second side 107b are pulled together.

As previously discussed, another advantage of the L-foot adapter assembly is its ability to accommodate rails with different spacing between their detents and bottom surfaces. Referring to FIG. 17, the first clamping portion 107d and the second clamping portion 107e are spaced apart so that the spacer top surface 108c seats the rail bottom surface 104c. In FIG. 15, the second lower rail detent 104e and the rail bottom surface 104c are spaced apart a distance d1. The second clamping portion 107e and the spacer top surface 108c are also spaced apart a distance d1. For rails with detent-to-bottom spacing other than d1, the manufacturer can provide a spacer with a different height to adjust for the change of distance. In contrast, other L-foot adapter designs typically would require a different L-foot adapter body to accommodate such a change.

Additional Details

Figure 3:
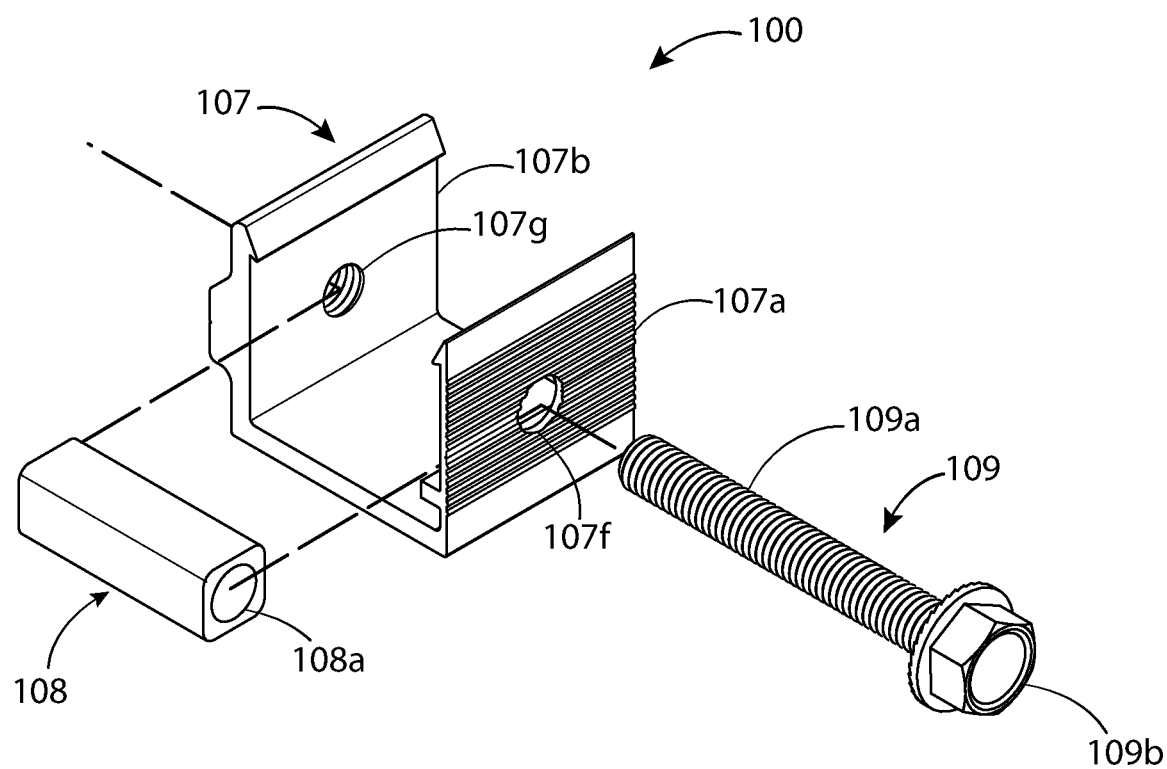
FIGS. 3-7 illustrate an L-foot adapter assembly in front exploded isometric view, front isometric view, rear isometric view, left side view, and top view, respectively.
Figure 4:
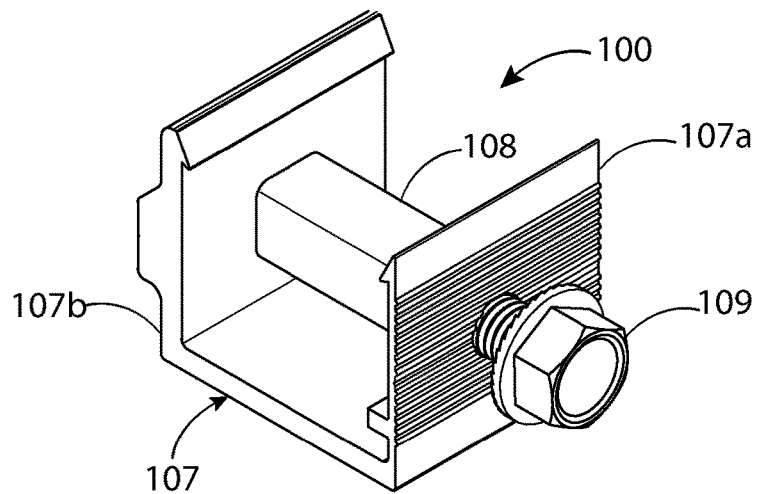

As discussed for FIGS. 3-8, the threaded fastener 109 extends through the first side 107a, through the spacer 108, and threadedly engages the second side 107b of the L-foot adapter body 107. Referring to FIG. 3, the fastener body 109a extends through an aperture 107f in the first side 107a of the L-foot adapter body 107. The fastener body 109a then extends through an aperture 108a in the spacer 108. The fastener body 109a then threadedly engages a threaded aperture 107g in the second side 107b. The fastener head 109b, and first side 107a, limit the extent of the threaded fastener 109 through the threaded aperture 107g. FIGS. 12-14 also show aperture 107f and threaded aperture 107g. FIG. 14 illustrates aperture 107f and threaded aperture 107g as dashed lines to indicate that they are hidden from view.

Figure 19:
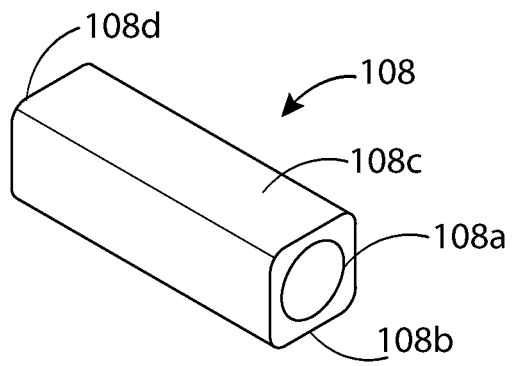
FIGS. 19 and 20 illustrate a front isometric view, and a top view of a spacer, respectively.
Figure 20:
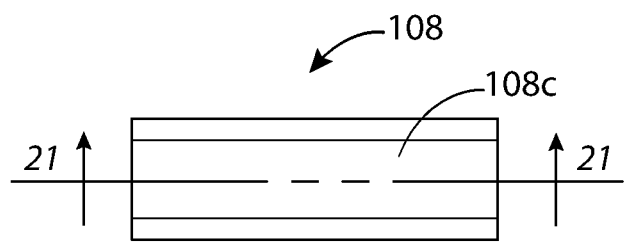
Figure 21:
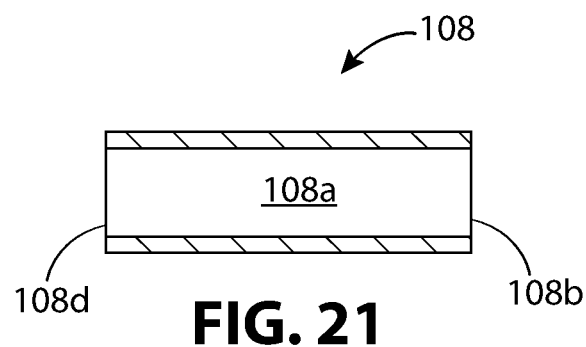
FIG. 21 illustrates a section view of FIG. 20 taken along section lines 21-21.

FIGS. 19-21 show the spacer 108 in more detail. FIG. 21 shows aperture 108a cross-sectionally. Referring to FIGS. 19 and 21, the aperture 108a extends between the spacer front 108b and the spacer back 108d. The aperture 108a typically is an unthreaded aperture. This prevents rotation of the spacer 108 as the threaded fastener threadedly engages the second side of the L-foot body. Referring to FIGS. 19 and 20, optionally, the spacer top surface 108c may be planar. Referring to FIG. 17, this allows the rail bottom surface 104c, if itself planar, to lay flat against the spacer top surface 108c.

Figure 5:
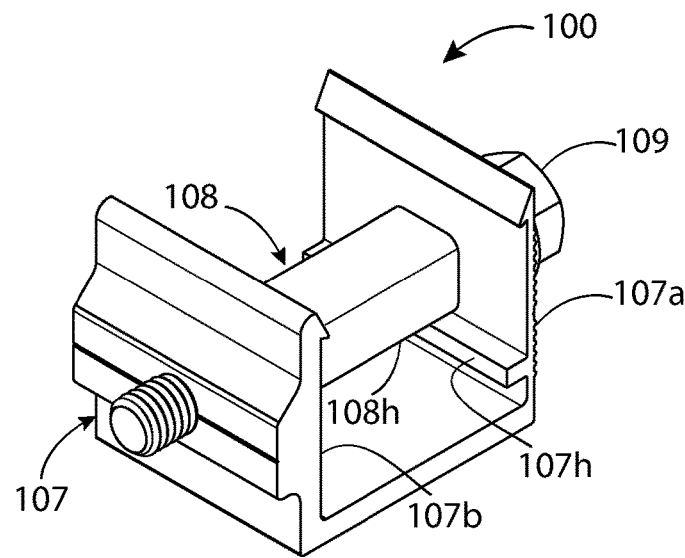
Figure 6:
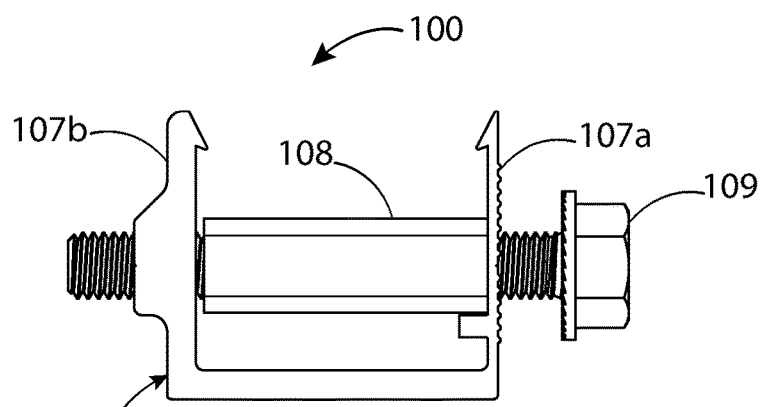
Figure 7:
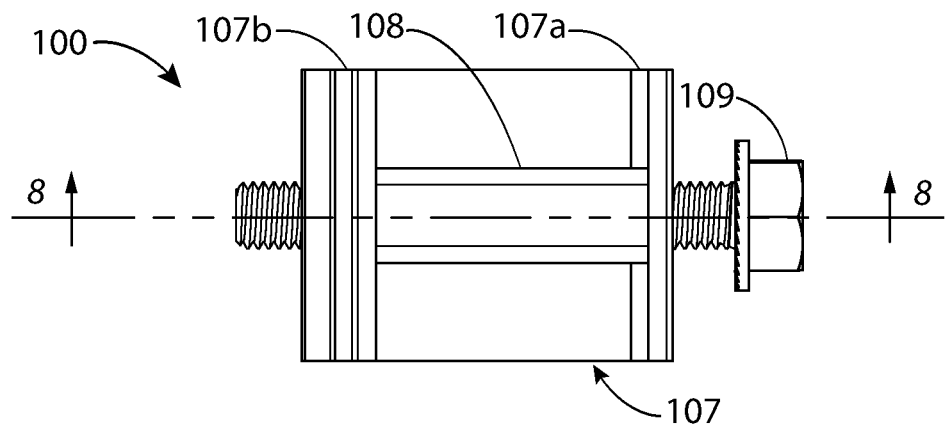
Figure 8:
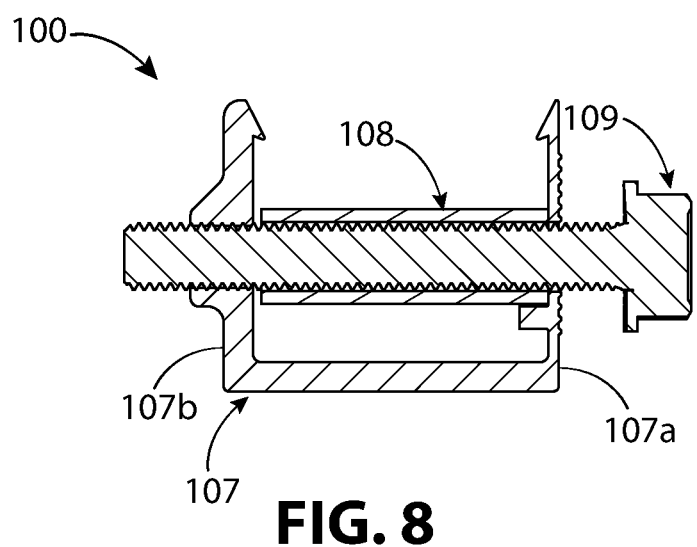
FIG. 8 illustrates a section view taken along section lines 8-8 in FIG. 7.

Referring to FIG. 5, to further prevent the spacer 108 from rotating, especially during installation, the L-foot adapter body 107 may include a platform 107h. The platform 107h extends inward from one side of the L-foot adapter body and is sized, shaped, and positioned to seat the spacer bottom surface 108h. The platform is illustrated as extending from first side 107a. FIGS. 12-14 also illustrate the platform 107h. FIG. 13 illustrates that the platform 107h may extend widthwise and the entire width (i.e., from left side to right side) of the L-foot adapter body 107.

Conclusion and Variations

The Summary, Detailed Description, and figures describe devices for attaching solar panels to roofs. These devices included L-foot adapter assemblies. This disclosure provides examples of devices, components, and configurations to help the reader understand the described general principles. The following are examples of variations and combinations of different devices, components, structures, and features that still adhere to the general principles.

Figure 22:
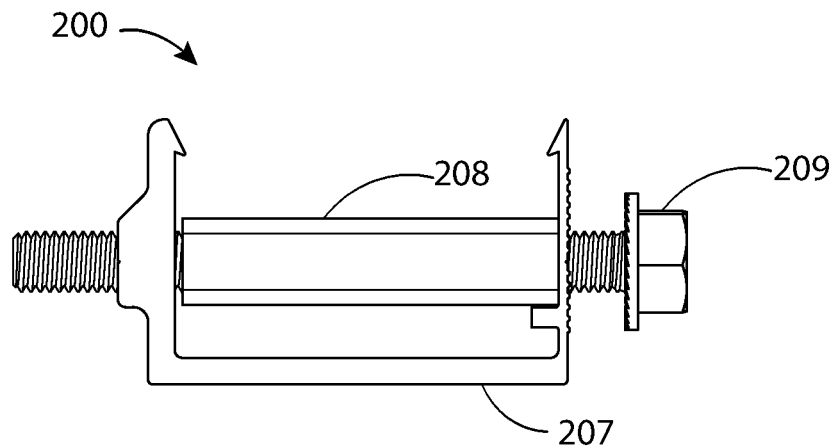
FIGS. 22-24 illustrate an alternative L-foot adapter assembly in left side view, front isometric view, and exploded front isometric view, respectively.
Figure 23:
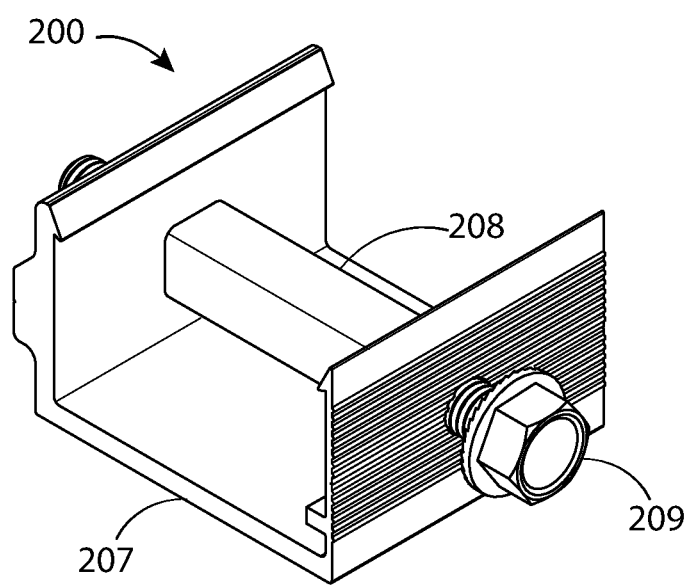
Figure 24:
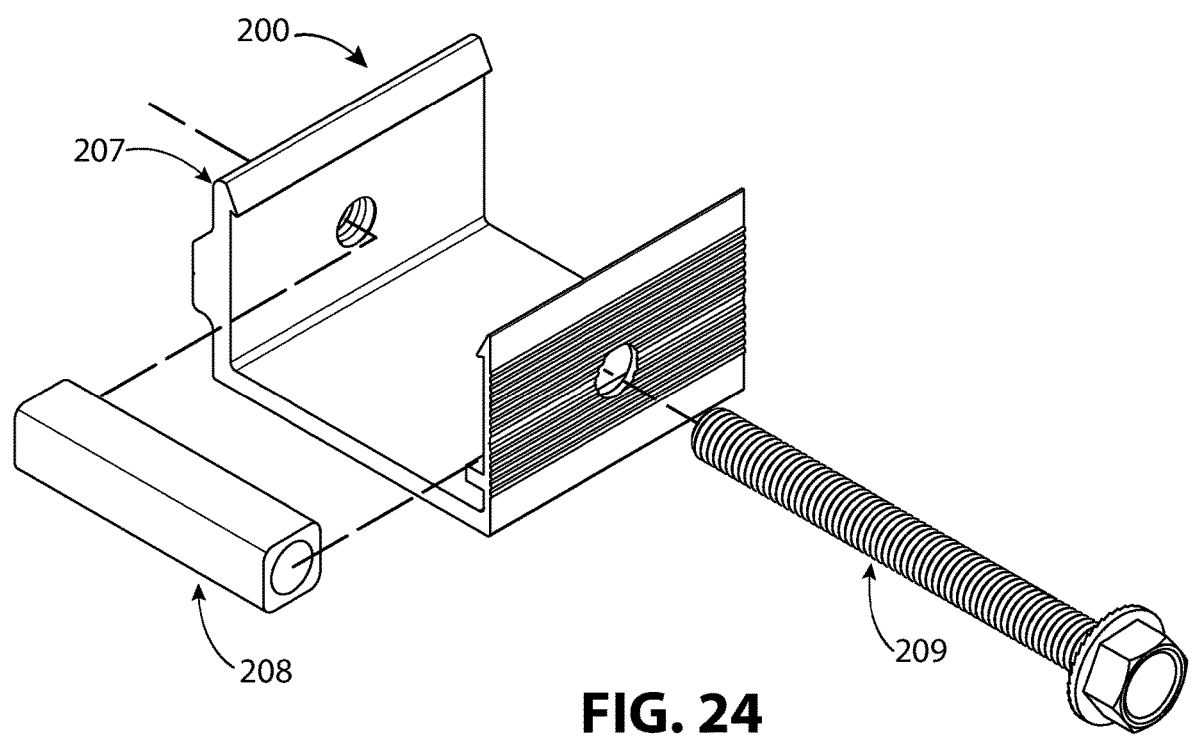

FIGS. 1-11 and 15-18 illustrate an L-foot adapter assembly 100 of a certain size, shape, and proportion. The L-foot adapter assembly can be other sizes, shapes, and proportions and still embody the principles discussed. For example, FIGS. 22-26 illustrate an alternative L-foot adapter assembly, L-foot adapter assembly 200, with a different widthwise and heightwise proportion than L-foot adapter assembly 100 of FIGS. 1-11 and 16-18. Referring to FIGS. 22-24, the L-foot adapter assembly includes L-foot adapter body 207, spacer 208, and threaded fastener 209. Except for their proportions, these are structured and function the same as the L-foot adapter assembly 100 of FIGS. 1-11 and 15-18. In fact, the L-foot adapter assembly 100 and the L-foot adapter assembly 200 are not mutually exclusive. For example, the length (i.e., from front to back) of the L-foot adapter body 207 can be applied to the L-foot adapter body 107 while the L-foot adapter body 107 maintains its original height and width.

Figure 25:
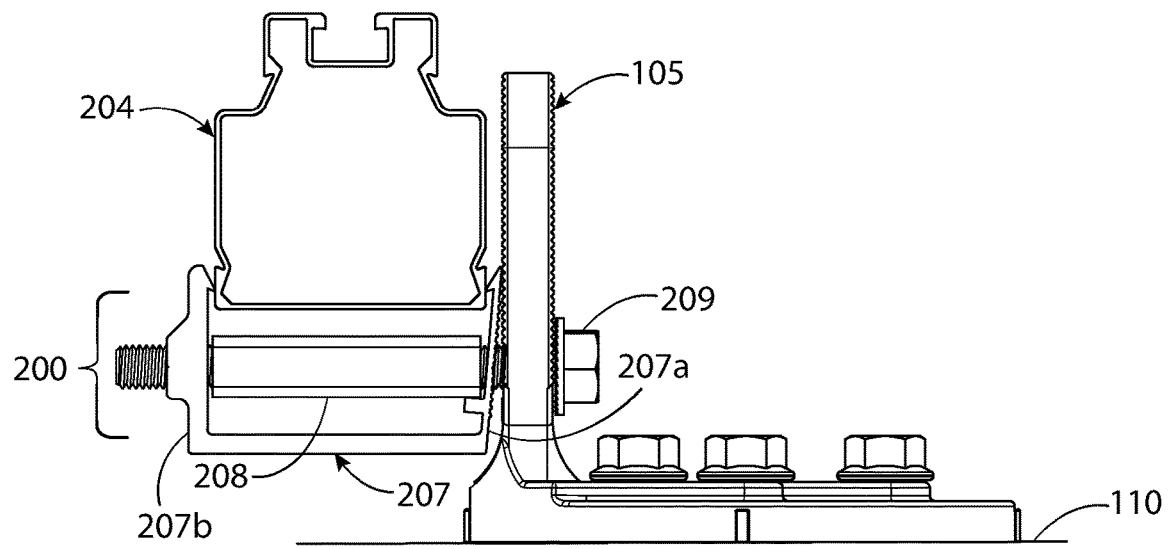
FIGS. 25 and 26 illustrate, left side view, installing a rail into the alternative L-foot adapter assembly.
Figure 26:
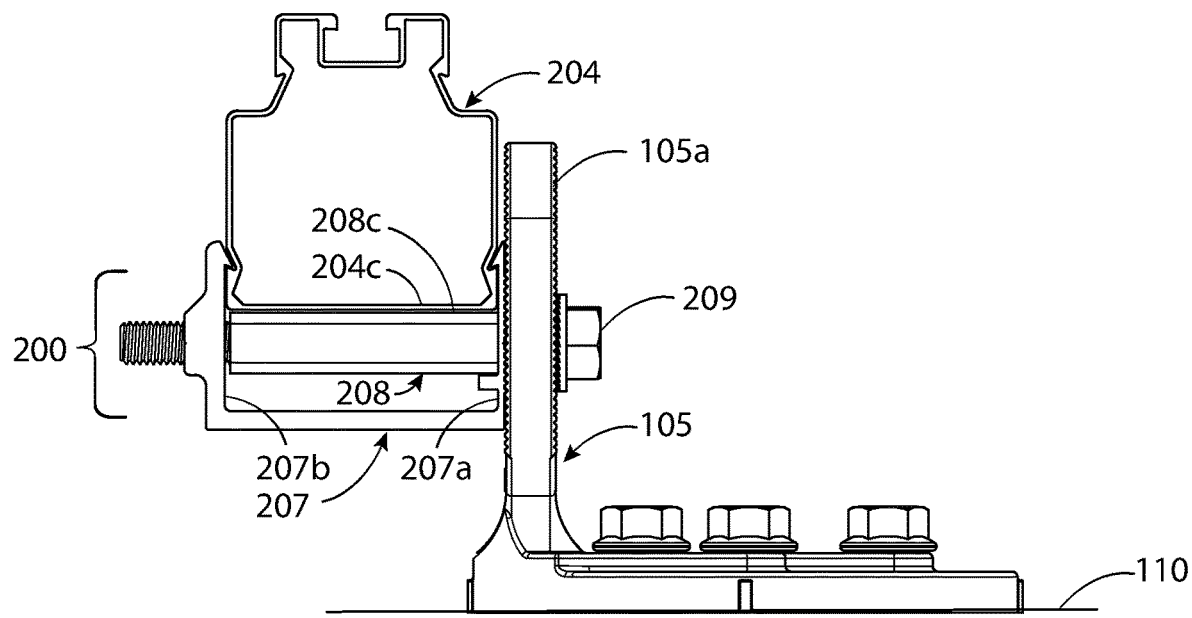

FIGS. 15-18 illustrate a rail 104 of a particular proportion. The L-foot adapter assembly of this disclosure can accommodate other rails. For example, FIGS. 25 and 26 show L-foot adapter assembly 200 securing rail 204 to roof 110. The rail 204 and L-foot adapter body 207 interact in the same way as described in FIGS. 15-18 for L-foot adapter body 107. For example, referring to FIG. 25, the first side 207a flexes as the rail 204 is inserted into the L-foot adapter body 207. The second side 207b remains stationary. Referring to FIG. 26, with the threaded fastener 209 tightened, the L-foot riser 105a and the first side 207a form a ridged structure. In addition, the rail bottom surface 204c seats against the spacer top surface 208c. If the threaded fastener 209 is fully tightened so that the spacer 208 contacts both the first side 207a and the second side 207b, the first side 207a, the L-foot riser 105a, the spacer 208, and the second side 207b form a second rigid structure.

FIGS. 1, 2, 9-11, 15-18, 25, and 26 show L-foot 105. The L-foot adapter assembly 100 of FIGS. 1-11 and 15-18 and the L-foot adapter assembly 200 of FIGS. 22-26 can couple with any L-foot capable of securing the solar panel racking systems associated with the above-mentioned L-foot adapter assemblies to a roof. U.S. Pat. Nos. 11,750,143, D983,018, and D909,853, show examples of suitable L-feet.

This disclosure shows the threaded fastener 109 of FIGS. 2-8, 10, 11, and 15-18 and threaded fastener 209 of FIGS. 22-26 as hex head screws. These threaded fasteners may be any threaded fastener with suitable holding force to withstand the operating and environmental conditions of a particular solar panel system installation. For example, national, regional, or local building codes may require the solar panel system to withstand specific wind forces or other harsh environmental conditions. While the fastener heads illustrated are hex head or flanged hex head, an installer or system designer can substitute other fastener heads that might be suitable for hand tools, electric, or pneumatic tools used to install the solar panel system. Examples of such fastener heads may include socket head, truss head, or pan head. These can include various drive patterns, for example, Phillips, slot, Torx, Frearson, Clutch, square (Robertson), hex, square slot combination, fluted socket, and various types of other drive patterns known in the art, and suitable for installing a solar panel system.

FIGS. 2-8 and 11-18 show the L-foot adapter body 107 as one-piece bodies, i.e., of one-piece or unitary construction. FIGS. 22-26 also show the L-foot adapter body 207 as one-piece bodies. A manufacturer could typically extrude, cast, or 3D print the L-foot adapter body. However, the L-foot adapter body can be formed by any method know to the art that can produce the L-foot adapter body 107, and L-foot adapter body 207, as a one-piece body with the flexing and rigidity characteristics as described. Referring to FIGS. 17 and 18, one-piece construction allows the L-foot adapter body 107 to grasp the rail 104, and allow the rail 104 height to be adjusted, while the threaded fastener 109 is loosened. While a one-piece body has these advantages, the inventor envisions that a two-piece body can be within the scope of the inventive concept. While losing the aforementioned advantage, a two-piece L-foot adapter body could include a spacer sized, shaped and spaced-apart from clamping portions as previously described.

FIG. 11 shows the slot-shaped opening 105c in the L-foot riser 105a as open on the top. This allows the L-foot adapter assembly 100 to slide into the slot-shaped opening 105c without removing the threaded fastener 109. However, the opening may be a closed slot shaped aperture or a simple circular aperture.

FIGS. 1, 2, 9-11, and 15-18 show the L-foot adapter assembly 100 coupled to an L-foot 105. Similarly, FIGS. 25 and 26 show the L-foot adapter assembly 200 also coupled to L-foot 105. The L-foot adapter assembly 100 and L-foot adapter assembly 200 do not necessarily require an L-foot for roof attachment. For example, under some circumstances, an installer could secure the L-foot adapter assembly 100 or L-foot adapter assembly 200 to a roof by extending a roof attachment fastener through the bottom of the L-foot adapter. Typically, the installer may use butyl rubber, EDPM (Ethylene Propylene Diene Monomer rubber), or other roof sealant between the bottom of the L-foot adapter and the roof.

For the purpose of this discussion, FIGS. 1 and 2 show solar panel system 101 and solar panel racking system 103 in simplified form. FIG. 1 illustrates two instances of the L-foot adapter assembly 100, one instance of solar panel 102, two instances of the rail 104, four instances of solar panel clamp 106, and two instances of L-foot 105. An actual solar panel system and solar panel racking system would have many more instances of these devices. An installer can use the described L-foot adapters, and their equivalents, in large or small solar panel systems.

The variations described, the general principles taught, and undescribed variations, devices, and systems that encompass the general principles described in this disclosure, are within the claim's scope.

The invention claimed is:

1. A device for securing and attaching to a rail, the rail including a rail bottom surface, and for securing a solar panel racking system to a roof, comprising:
an L-foot adapter assembly including:
an L-foot adapter body including a bottom, a first side and a second side each extending upward from the bottom;
a spacer including a spacer front facing the first side, a spacer back facing the second side, and an aperture extending through the spacer front and the spacer back, the spacer front and the spacer back are removably positioned between the first side and the second side;
a threaded fastener extends through the first side, through the aperture in the spacer, and threadedly engages the second side;
the first side includes a first clamping portion and the second side includes a second clamping portion; and
the first clamping portion and the second clamping portion are structured to secure and prevent upward movement of the rail, the first side, the second side, the first clamping portion, and the second clamping portion are spaced apart and positioned so that the rail bottom surface seats directly against the spacer.

2. The device of claim 1, wherein:
the spacer limits how much the first side and the second side can be squeezed together and prevents overtightening of the threaded fastener.

3. The device of claim 1, wherein:
the L-foot adapter body is u-shaped and comprises a one-piece body;
the first side is cross-sectionally narrower than the second side; and
with the first side and the second side pressed outward, the first side may flex with respect to the bottom of the L-foot adapter body while the second side remains rigid or stationary with respect to the bottom.

4. The device of claim 1, wherein:
with the threaded fastener fully tightened so that the spacer contacts both the first side and the second side, the first side, the spacer, and the second side form a rigid structure.

5. The device of claim 1, wherein:
the L-foot adapter body is u-shaped and comprises a one-piece body.

6. The device of claim 1, further comprising:
an L-foot including an L-foot base and an L-foot riser extending upward from the L-foot base, the L-foot base is structured to attach to the roof; and
the threaded fastener extends through the L-foot riser, through the first side, through the spacer, and threadedly engages the second side.

7. The device of claim 6, wherein:
the L-foot adapter body comprises a one-piece body;
the first side is cross-sectionally narrower than the second side;
with the first side and the second side pressed outward, the first side may flex with respect to the bottom while the second side remains rigid or stationary with respect to the bottom; and
with the threaded fastener tightened, the first side and the L-foot riser form a first rigid structure.

8. The device of claim 7, wherein with the threaded fastener fully tightened so that the spacer contacts both the first side and the second side, the first side, the L-foot riser, the spacer, and the second side form a second rigid structure.

9. The device of claim 8, wherein:
the spacer includes a spacer top surface that is planar and is sized and shaped to directly seat the rail bottom surface.

10. The device of claim 8, wherein:
the spacer includes a spacer bottom surface extending from the spacer front and the spacer back; and
the L-foot adapter body includes a platform, the platform extends inward from the first side and is sized, shaped, and position to seat the spacer bottom surface and prevent the spacer from rotating.

11. A device for securing and attaching to a rail, the rail including a rail bottom surface, and for securing a solar panel racking system to a roof, comprising:
an L-foot adapter assembly including:
an L-foot adapter body including a bottom, a first side and a second side each extending upward from the bottom;
a spacer including a spacer front facing the first side, a spacer back facing the second side, and an aperture extending through the spacer front and the spacer back, the spacer front and the spacer back are removably positioned between the first side and the second side;

a threaded fastener extends through the first side, through the aperture in the spacer, and threadedly engages the second side; and the spacer includes a spacer top surface that is planar, the spacer, the first side and the second side are structured and positioned to seat the rail bottom surface directly seats against the spacer.

12. The device of claim 11, wherein:
the spacer limits how much the first side and the second side can be squeezed together and prevents overtightening of the threaded fastener.

13. The device of claim 11, wherein:
the L-foot adapter body is u-shaped and comprises a one-piece body;
the first side is cross-sectionally narrower than the second side; and
with the first side and the second side pressed outward, the first side may flex with respect to the bottom of the L-foot adapter body while the second side remains rigid or stationary with respect to the bottom.

14. The device of claim 11, further comprising:
an L-foot including an L-foot base and an L-foot riser extending upward from the L-foot base, the L-foot base is structured to attach to the roof; and
the threaded fastener extends through the L-foot riser, through the first side, through the spacer, and threadedly engages the second side.

15. A device for securing and attaching to a rail, the rail including a rail bottom surface, and for securing a solar panel racking system to a roof, comprising:
an L-foot adapter assembly including:
an L-foot adapter body including a bottom, a first side and a second side each extending upward from the bottom;
a spacer including a spacer front facing the first side, a spacer back facing the second side, and an aperture extending through the spacer front and the spacer back, the spacer front and the spacer back are removably positioned between the first side and the second side;
a threaded fastener extends through the first side, through the aperture in the spacer, and threadedly engages the second side;
the spacer includes a spacer bottom surface; and
the L-foot adapter body includes a platform, the platform extends inward from the first side and is sized, shaped, and position to seat the spacer bottom surface and prevent the spacer from rotating.

16. The device of claim 15, wherein:
the spacer limits how much the first side and the second side can be squeezed together and prevents overtightening of the threaded fastener.

17. The device of claim 15, wherein:
the L-foot adapter body is u-shaped and comprises a one-piece body;
the first side is cross-sectionally narrower than the second side; and
with the first side and the second side pressed outward, the first side may flex with respect to the bottom of the L-foot adapter body while the second side remains rigid or stationary with respect to the bottom.

18. The device of claim 15, further comprising:
an L-foot including an L-foot base and an L-foot riser extending upward from the L-foot base, the L-foot base is structured to attach to the roof; and
the threaded fastener extends through the L-foot riser, through the first side, through the spacer, and threadedly engages the second side.

19. A device for securing and attaching to a rail, the rail including a rail bottom surface, and for securing a solar panel racking system to a roof, comprising:
an L-foot adapter assembly including:
an L-foot adapter body including a bottom, a first side and a second side each extending upward from the bottom;
a spacer, removably positioned between the first side and the second side, the spacer, the first side, and the second side, are structured and positioned to seat the rail bottom surface directly against the spacer;
a threaded fastener extends through the first side, through the spacer, and threadedly engages the second side;
the first side includes a first clamping portion and a second side includes a second clamping portion; and
the first clamping portion and the second clamping portion are structured to secure and prevent upward movement of the rail, the first side, the second side, the first clamping portion, and the second clamping portion are spaced apart and positioned so that the rail bottom surface seats directly against the spacer.

20. The device of claim 19, wherein:
the spacer includes a spacer front facing the first side, a spacer back facing the second side, and an aperture extending through the spacer front and the spacer back, the spacer front and the spacer back are removably positioned between the first side and the second side; and
the threaded fastener extends through the aperture in the spacer.

21. The device of claim 19, wherein:
the L-foot adapter body is u-shaped and comprises a one-piece body.

22. A device for securing and attaching to a rail, the rail and for securing a solar panel racking system to a roof, comprising:
the rail including a rail bottom surface; and
an L-foot adapter assembly including:
an L-foot adapter body including a bottom, a first side and a second side each extending upward from the bottom;
a spacer, removably positioned between the first side and the second side, the rail bottom surface is seated directly against the spacer; and
a threaded fastener extends through the first side, through the spacer, and threadedly engages the second side;
the spacer includes a spacer front facing the first side, a spacer back facing the second side, and an aperture extending through the spacer front and the spacer back, the spacer front and the spacer back are removably positioned between the first side and the second side; and
the threaded fastener extends through the aperture in the spacer.

23. The device of claim 22, wherein:
the first side includes a first clamping portion and the second side includes a second clamping portion; and the first clamping portion and the second clamping portion engage the rail and prevent upward movement of the rail.

24. The device of claim 22, wherein:

the rail includes a first rail side and a second rail side spaced extending upward from and apart by the rail bottom surface, the first rail side includes a first lower rail detent and the second rail side includes a second lower rail detent;

the first side of the L-foot adapter body includes a first clamping portion, the second side of the L-foot adapter body includes a second side with a second clamping portion; and the first clamping portion engages the first lower rail detent and the second clamping portion engages the second lower rail detent and prevents upward movement of the rail.

25. The device of claim 22, wherein:

the L-foot adapter body is u-shaped and comprises a one-piece body.

\* \* \* \* \*